United States Patent
Zhu et al.

(10) Patent No.: US 11,910,277 B2
(45) Date of Patent: Feb. 20, 2024

(54) MULTICAST-BROADCAST SERVICES CONFIGURATION EXCHANGE FOR MOBILITY, SINGLE-FREQUENCY NETWORK AND INTERFERENCE COORDINATION

(71) Applicant: QUALCOMM Incorporated, San Diego, CA (US)

(72) Inventors: Xipeng Zhu, San Diego, CA (US); Prasad Reddy Kadiri, San Diego, CA (US); Luis Fernando Brisson Lopes, Swindon (GB); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/568,509

(22) Filed: Jan. 4, 2022

(65) Prior Publication Data

US 2022/0360947 A1 Nov. 10, 2022

Related U.S. Application Data

(60) Provisional application No. 63/184,657, filed on May 5, 2021.

(51) Int. Cl.
*H04W 4/06* (2009.01)
*H04W 76/20* (2018.01)
(Continued)

(52) U.S. Cl.
CPC ......... *H04W 4/06* (2013.01); *H04W 36/0033* (2013.01); *H04W 76/20* (2018.02); *H04L 12/189* (2013.01)

(58) Field of Classification Search
None
See application file for complete search history.

(56) References Cited

U.S. PATENT DOCUMENTS 10,856,306 B2 * 12/2020 Park ................... H04W 4/40
2012/0236776 A1 9/2012 Zhang et al.
(Continued)

FOREIGN PATENT DOCUMENTS

WO WO-2015000912 A1 1/2015

OTHER PUBLICATIONS

Ericsson: "Mobility for NR MBS", 3GPP TSG-RAN WG2 #113e, R2-2101171, 3rd Generation Partnership Project, Mobile Competence Centre, 650, Route Des Lucioles, F-06921 Sophia-Antipolis Cedex, France, vol. RAN WG2, No. Electronic Meeting, Jan. 25, 2021-Feb. 5, 2021 Jan. 14, 2021 (Jan. 14, 2021), XP051972834, pp. 1-6, Retrieved from the Internet: URL: https://ftp.3gpp.org/tsg_ran/WG2_RL2/TSGR2_113-e/Docs/R2-2101171.zip R2-2101171—Mobility for NR MBS.docx.

(Continued)

*Primary Examiner* — Eunsook Choi
(74) *Attorney, Agent, or Firm* — Holland & Hart LLP

(57) ABSTRACT

Methods, systems, and devices for wireless communications are described. In some systems, a first base station and a second base station may be neighbor base stations and the first base station may receive, from the second base station, information relating to a multicast-broadcast services (MBS) session context of an MBS session supported by the second base station. The first base station may use the received MBS session context information to control communication or connections between the first base station and one or more user equipment (UEs) that are served by the first base station. For example, the first base station may use the received MBS session context information for target cell selection in a handover procedure, an MBS-specific measurement configuration, interference avoidance, or system information block (SIB) construction, among various other use cases.

28 Claims, 9 Drawing Sheets

(51) Int. Cl.
*H04W 36/00* (2009.01)
*H04L 12/18* (2006.01)

(56) References Cited

U.S. PATENT DOCUMENTS

2018/0160342 A1\* 6/2018 Park .................. H04W 36/0033
2023/0051095 A1\* 2/2023 Wei ....................... H04W 48/14

OTHER PUBLICATIONS

International Search Report and Written Opinion—PCT/US2022/071538—ISA/EPO—dated Jun. 29, 2022.
Qualcomm Inc: "NR Multicast Broadcast Mobility Enhancements with Service", 3GPP TSG-RAN WG2 Meeting #113e, R2-2100414 (Revision of R2-2009035), 3rd Generation Partnership Project, Mobile Competence Centre, 650, Route Des Lucioles, F-06921 Sophia-Antipolis Cedex, France, vol. RAN WG2, No. E-Meeting, Jan. 25, 2021-Feb. 5, 2021 Jan. 15, 2021, XP051973596, 7 Pages, Retrieved from the Internet: URL: https://ftp.3gpp.org/tsg_ran/WG2_RL2/TSGR2_113-e/Docs/R2- 2100414.zip R2- 2100414_NR Multicast Mobility Enhancements with Service Continuity_v1.doc.
ZTE: "Basic Inter-gNB Handover Procedure", 3GPP TSG RAN WG2#NR_AdHoc#2, R2-1706663 Basic Inter-gNB Handover Procedure, 3rd Generationpartnership Project, Mobile Competence Centre, 650, Route Deslucioles, F-06921 Sophia-Antipolis Cedex, France, vol. RAN WG2, No. Qingdao, China, Jun. 27, 2017-Jun. 29, 2017 Jun. 26, 2017, XP051301163, 5 Pages, Retrieved from the Internet: URL: http://www.3gpp.org/ftp/Meetings_3GPP_SYNC/RAN2/Docs/.

\* cited by examiner

MULTICAST-BROADCAST SERVICES CONFIGURATION EXCHANGE FOR MOBILITY, SINGLE-FREQUENCY NETWORK AND INTERFERENCE COORDINATION

CROSS REFERENCE

The present application for patent claims the benefit of U.S. Provisional Patent Application No. 63/184,657 by ZHU et al., entitled "MULTICAST-BROADCAST SERVICES CONFIGURATION EXCHANGE FOR MOBILITY, SINGLE-FREQUENCY NETWORK AND INTERFERENCE COORDINATION," filed May 5, 2021, assigned to the assignee hereof, and expressly incorporated by reference herein.

FIELD OF TECHNOLOGY

The following relates to wireless communications, including multicast-broadcast services (MBS) configuration exchange for mobility, single-frequency network and interference coordination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a base station may transmit signaling associated with a multicast-broadcast services (MBS) session to one or more UEs.

SUMMARY

The described techniques relate to improved methods, systems, devices, and apparatuses that support multicast-broadcast services (MBS) configuration exchange for mobility, single-frequency network and interference coordination. Generally, the described techniques support signaling mechanisms for exchanging MBS session context information between base stations or network nodes. As such, one or more base stations may obtain shared or common knowledge of various MBS sessions that are supported by neighboring base stations, which may provide the one or more base stations with greater or more complete knowledge of network operations and services. For example, a first base station may receive, from a second base station, MBS session context information for an MBS session supported by the second base station and may coordinate with the second base station using the received MBS session context information. In some implementations, the first base station may communicate with a user equipment (UE) served by the first base station in accordance with the MBS session supported by the second base station and based on (e.g., as a result of) the network coordination. Such communication may vary for different scenarios or use cases, but may commonly include the transmission of control signaling to the UE and at least the potential for modifying a connection between the UE and the first base station based on the MBS session context information provided by the second base station.

A method for wireless communication at a first network node is described. The method may include receiving, from a second network node, MBS session context information for a multicast-broadcast session associated with the second network node, transmitting a control message to a UE in accordance with the multicast-broadcast session associated with the second network node and based on a coordination between the first network node and the second network node, and modifying a connection between the UE and the first network node based on the control message and the received MBS session context information.

An apparatus for wireless communication at a first network node is described. The apparatus may include a processor, memory coupled with the processor, and instructions stored in the memory. The instructions may be executable by the processor to cause the apparatus to receive, from a second network node, MBS session context information for a multicast-broadcast session associated with the second network node, transmit a control message to a UE in accordance with the multicast-broadcast session associated with the second network node and based on a coordination between the first network node and the second network node, and modify a connection between the UE and the first network node based on the control message and the received MBS session context information.

Another apparatus for wireless communication at a first network node is described. The apparatus may include means for receiving, from a second network node, MBS session context information for a multicast-broadcast session associated with the second network node, means for transmitting a control message to a UE in accordance with the multicast-broadcast session associated with the second network node and based on a coordination between the first network node and the second network node, and means for modifying a connection between the UE and the first network node based on the control message and the received MBS session context information.

A non-transitory computer-readable medium storing code for wireless communication at a first network node is described. The code may include instructions executable by a processor to receive, from a second network node, MBS session context information for a multicast-broadcast session associated with the second network node, transmit a control message to a UE in accordance with the multicast-broadcast session associated with the second network node and based on a coordination between the first network node and the second network node, and modify a connection between the UE and the first network node based on the control message and the received MBS session context information.

Some examples of the method, apparatuses, and non-transitory computer-readable medium described herein may further include operations, features, means, or instructions for receiving, from the second network node, beam configuration information including, for each beam associated with the beam configuration information, an indication of whether that beam may be used for a multicast-broadcast single-frequency network of the multicast-broadcast session associated with the second network node.

In some examples of the method, apparatuses, and non-transitory computer-readable medium described herein, the MBS session context information includes a MBS availability for the multicast-broadcast session associated with the second network node, a multicast-broadcast radio bearer (MRB) resource configuration for the multicast-broadcast session associated with the second network node, and a multicast-broadcast single-frequency network configuration for a multicast-broadcast single-frequency network of the multicast-broadcast session associated with the second network node.

In some examples of the method, apparatuses, and non-transitory computer-readable medium described herein, the MBS availability includes a session identifier associated with the multicast-broadcast session associated with the second network node.

In some examples of the method, apparatuses, and non-transitory computer-readable medium described herein, the MRB resource configuration includes an indication of a directional beam, a frequency domain resource configuration, and a time domain resource configuration associated with the multicast-broadcast session associated with the second network node.

In some examples of the method, apparatuses, and non-transitory computer-readable medium described herein, the multicast-broadcast single-frequency network configuration includes an indication of a directional beam, a geographic area, a frequency domain resource configuration, and a time domain resource configuration associated with the multicast-broadcast single-frequency network of the multicast-broadcast session associated with the second network node.

In some examples of the method, apparatuses, and non-transitory computer-readable medium described herein, the multicast-broadcast single-frequency network configuration includes a back-off request and at least one of a cell list or a beam list for back-off by the first network node.

In some examples of the method, apparatuses, and non-transitory computer-readable medium described herein, the control message to the UE includes signaling associated with a handover of the UE from the first network node to the second network node based on matching the MBS session context information for the multicast-broadcast session associated with the second network node to a multicast-broadcast service request of the UE and modifying the connection between the UE and the first network node includes performing the handover of the UE from the first network node to the second network node.

Some examples of the method, apparatuses, and non-transitory computer-readable medium described herein may further include operations, features, means, or instructions for selecting the second network node as a target base station for the handover of the UE based on the matching of the MBS session context information for the multicast-broadcast session associated with the second network node to the multicast-broadcast service request of the UE.

In some examples of the method, apparatuses, and non-transitory computer-readable medium described herein, the control message to the UE includes signaling configuring a measurement, by the UE, of the multicast-broadcast session associated with the second network node and modifying the connection between the UE and the first network node includes performing a handover of the UE from the first network node to the second network node based on the measurement by the UE.

In some examples of the method, apparatuses, and non-transitory computer-readable medium described herein, the control message to the UE includes signaling scheduling communication between the UE and the first network node to avoid interference with the multicast-broadcast session associated with the second network node and modifying the connection between the UE and the first network node includes modifying the scheduling of the communication between the UE and the first network node to avoid the interference with the multicast-broadcast session associated with the second network node.

In some examples of the method, apparatuses, and non-transitory computer-readable medium described herein, the control message to the UE includes a system information block (SIB) including information relating to the received MBS session context information and modifying the connection between the UE and the first network node includes modifying system information associated with the first network node to include the information relating to the received MBS session context information.

In some examples of the method, apparatuses, and non-transitory computer-readable medium described herein, the coordination between the first network node and the second network node includes a comparing, by the first network node, of the multicast-broadcast session associated with the second network node with a multicast-broadcast session associated with the first network node and the coordination between the first component of the first network node and the second component of the first network node, or both, includes a relaying of the received MBS session context information between the first component and the second component.

In some examples of the method, apparatuses, and non-transitory computer-readable medium described herein, the first network node includes a first base station and the second network node includes a second base station, and the receiving of the MBS session context information for the multicast-broadcast session associated with the second network node is via an Xn interface between the first base station and the second base station.

In some examples of the method, apparatuses, and non-transitory computer-readable medium described herein, the first network node includes a first component of a base station and the second network node includes a second component of the base station, and the receiving of the MBS session context information for the multicast-broadcast session associated with the second network node is via an F1 interface between the first component and the second component.

DETAILED DESCRIPTION

Figure 1:
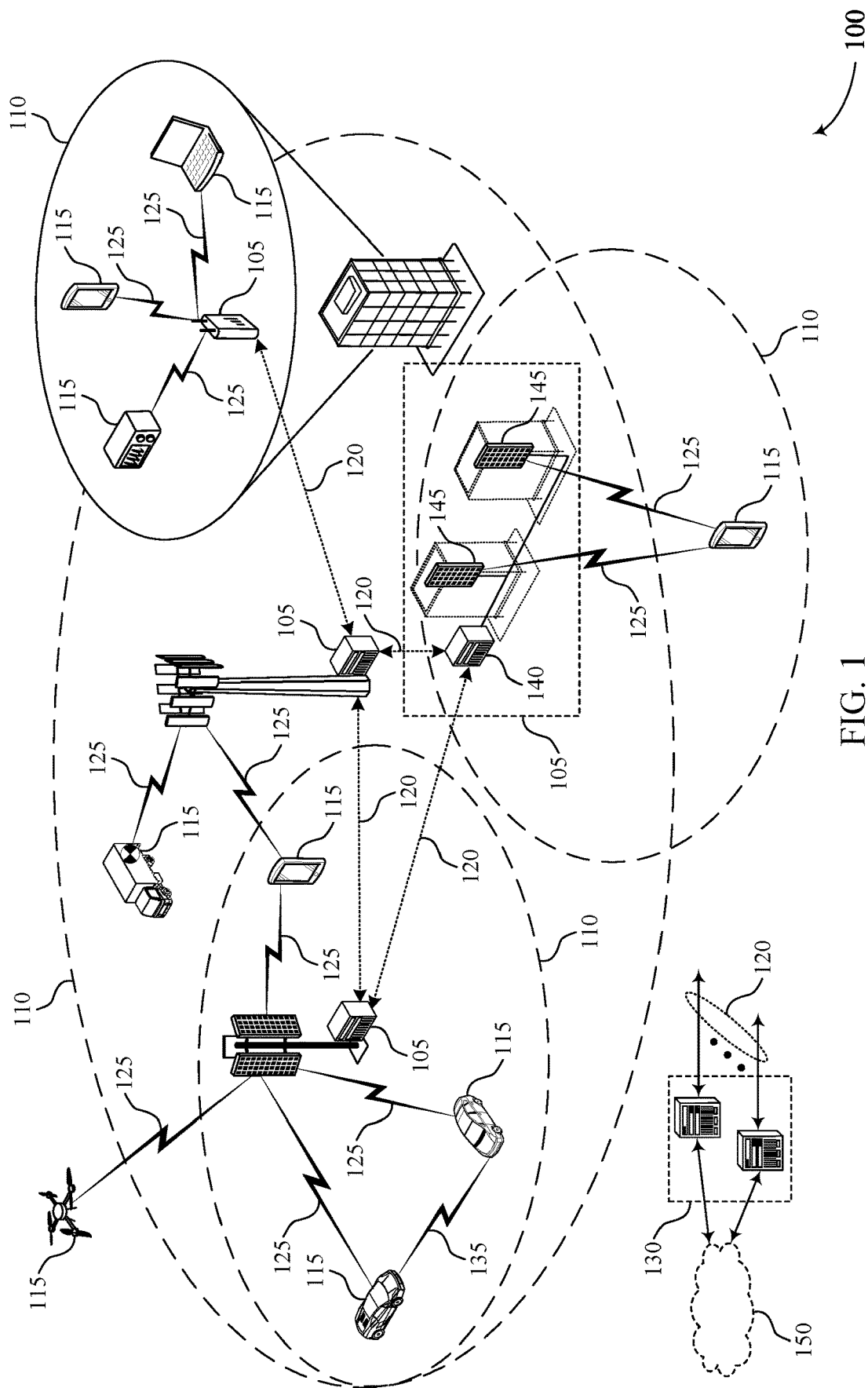
FIGS. 1 and 2 show examples of wireless communications systems that support multicast-broadcast services (MBS) configuration exchange for mobility, single-frequency network and interference coordination in accordance with aspects of the present disclosure.

In some wireless communications systems, a first base station may transmit signaling associated with a multicast-broadcast services (MBS) session supported by the first base station to one or more user equipment (UEs). A second base station (e.g., a neighbor base station) may similarly transmit signaling associated with an MBS session supported by the second base station and, in some cases, the MBS session supported by the second base station may be relevant for or impact one or more of the first base station, a UE served by the first base station, or communication between the UE and the first base station. For example, the MBS session supported by the second base station may be relevant for a decision regarding a handover of the UE from the first base station to the second base station, interference coordination between the first base station and the second base station, or system information provided by the first base station. In some cases, however, the first base station may be unaware of the MBS session supported by the second base station and, as such, may be unable to account for the MBS session supported by the second base station in handovers, interference coordination, or system information construction.

In some implementations of the present disclosure, the first base station and the second base station may support a signaling mechanism for exchanging or sharing MBS session context information for the MBS sessions supported by one or both of the first base station or the second base station. For example, the first base station may receive, from the second base station, MBS session context information for the MBS session supported by the second base station via specified signaling. As such, the first base station may account for, consider, or otherwise use the MBS session supported by the second base station if making decisions relating to a handover, interference coordination, or system information construction. In some examples, the first base station may receive the MBS session context information via an information element (IE) carrying served cell information and the MBS session context information may include an MBS service availability, a multicast-broadcast radio bearer (MRB) (which may be equivalently referred to as a multicast radio bearer or a multipoint radio bearer) resource configuration, and a multicast-broadcast single frequency network (MBSFN) configuration for the MBS session supported by the second base station.

Additionally or alternatively, the first base station may receive beam configuration information from the second base station indicating which beams of the second base station are used for MBSFN transmissions. In some examples, the first base station may configure measurements by a UE served by the first base station in accordance with which beams the second base station uses for MBSFN transmissions or may modify scheduling of communication between the UE and the first base station to avoid interference with the MBSFN transmissions.

Particular aspects of the subject matter described in this disclosure can be implemented to realize one or more of the following potential advantages. For example, the described techniques may be implemented to provide greater inter-base station and network coordination as a result of the exchanging or sharing of MBS session context information between base stations. Further, the first base station may enhance connectivity, data rates, or system capacity by using the MBS session context information received from the second base station in handover decisions, interference coordination, and system information construction. For example, if the first base station identifies that the MBS session supported by the second base station is compatible with an MBS session requested by a UE served by the first base station, the first base station may prioritize the second base station (over other neighboring base stations that may not support the MBS session requested by the UE) if performing a handover for the UE. Additionally or alternatively, the first base station may modify a scheduling decision to avoid interference with the MBS session of the second base station or to modify system information to reflect the MBS session context information provided by the second base station, which may increase the likelihood for successful communication for both the first base station and the second base station as well as provide greater or more complete knowledge of network operations or services at the base stations and all served UEs. Such a greater likelihood for successful communication may support greater spectral efficiency, higher data rates, and greater system capacity, among other benefits.

Aspects of the disclosure are initially described in the context of wireless communications systems. Additionally, aspects of the disclosure are illustrated and described with reference to a process flow. Aspects of the disclosure are further illustrated by and described with reference to apparatus diagrams, system diagrams, and flowcharts that relate to multicast-broadcast services configuration exchange for mobility, single-frequency network and interference coordination.

FIG. 1 illustrates an example of a wireless communications system 100 that supports MBS configuration exchange for mobility, single-frequency network and interference coordination in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, base stations 105 may transmit signaling associated with MBS session supported by the base stations 105. Such signaling may include multicast signaling or broadcast signaling, and may be equivalently referred to as point-to-multipoint signaling. For example, a base station 105 may transmit signaling associated with an MBS session to multiple UEs 115 (e.g., a set of UEs 115 or all UEs 115 served by that base station 105). In some cases, different base stations 105 may support different MBS sessions (e.g., different MBS session types, different MBS flows and quality of service (QoS), or have different MBS session availabilities) and an exchange of MBS session context information between the different base stations 105 may provide greater system coordination and may improve communication efficiency in some scenarios.

In some implementations of the present disclosure, a first base station 105 may receive MBS session context information from a second base station 105 for an MBS session supported by the second base station 105. In some examples, the second base station 105 may provide the MBS session context information via an MBS session context IE within a served cell IE via an Xn or F1 interface between the first base station 105 and the second base station 105. As a result of receiving the MBS session context information from the second base station 105, the first base station 105 may transmit a control message to a UE 115 that is served by the first base station 105 in accordance with the MBS session supported by the second base station 105 and, in some examples, may modify a connection between the UE 115 and the first base station 105 based on the control message and the MBS session context information received from the second base station 105. As described herein, such modification of the connection between the UE 115 and the first base station 105 may include performing a handover of the UE 115, modifying scheduling decisions for communication between the UE 115 and the base station 105, or modifying system information provided by the first base station 105.

Figure 2:
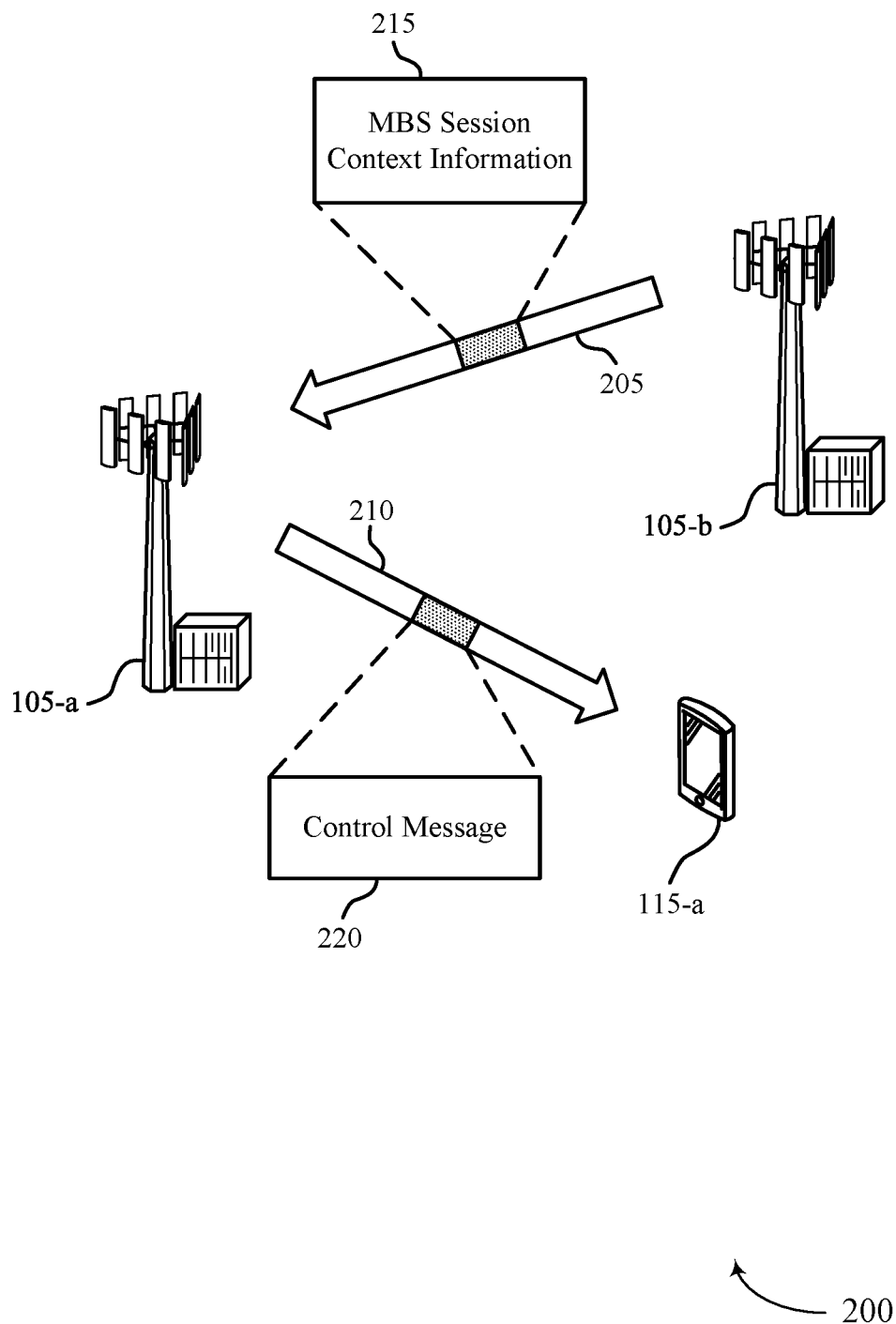

FIG. 2 illustrates an example of a wireless communications system 200 that supports MBS configuration exchange for mobility, single-frequency network and interference coordination in accordance with aspects of the present disclosure. The wireless communications system 200 may implement or be implemented to realize aspects of the wireless communications system 100. For example, the wireless communications system 200 may include a UE 115-a, a base station 105-a, and a base station 105-b, which may be examples of corresponding devices described herein, including with reference to FIG. 1. In some examples, the base station 105-a (a first, receiving base station) may receive MBS session context information 215 from the base station 105-b (a second, transmitting base station) and may modify a connection with the UE 115-a in accordance with the MBS session context information 215 provided by the base station 105-b and based on a coordination between the base station 105-a and the base station 105-b.

For example, the UE 115-a may establish a connection with the base station 105-a and, in some implementations, the base station 105-a and the base station 105-b may exchange MBS configuration information via a communication link 205 (e.g., a backhaul link) for mobility and interference coordination. Such a communication link 205 may feature, include, or be an example of an Xn interface or an F1 interface. In examples in which the base station 105-a and the base station 105-b communicate via an Xn interface, both the base station 105-a and the base station 105-b may communicate as standalone base stations (e.g., standalone gNBs). In other words, communication over an Xn interface may refer to gNB-gNB communication.

Alternatively, in examples in which the base station 105-a and the base station 105-b communicate via an F1 interface, the base station 105-a and the base station 105-b may communicate as part of a distributed network in which one or both of the base station 105-a or the base station 105-b may feature multiple distinct components, wireless roles, or network functionalities. For example, one or both of the base station 105-a or the base station 105-b may feature, operate as, or otherwise support a distributed unit (DU) functionality, a centralized unit (CU) functionality, or a radio unit (RU) functionality, or any combination thereof. In other words, communication over an F1 interface may refer to DU-CU-DU communication, DU-CU-gNB communication, or gNB-CU-DU communication. Such a distributed or open network may include networks in which a component or network node featuring DU functionality, a component or network node featuring CU functionality, and a component or network node featuring RU functionality (if applicable) are located at spatially separate locations or at a same spatial location but with otherwise separate functionality.

In an example, a network in which the base station 105-a or the base station 105-b function or operate as multiple components that are each located at various physical locations may be referred to as or may be associated with a disaggregated radio access network (RAN) architecture, such as an Open RAN (O-RAN) or Virtualized RAN (VRAN) architecture. In such examples, the base station 105-a may be a first network node operating as a DU, a CU, or an RU and the base station 105-b may be a second network node operating as a DU, a CU, or an RU. As such, and in accordance with the examples disclosed herein, a first network node (e.g., a CU) may exchange MBS configuration information with a second network node (e.g., a DU) or with multiple other network nodes (e.g., one or more DUs or one or more CUs, or any combination thereof).

An MBS session of the base station 105-a or the base station 105-b may refer to any multicast or broadcast signaling, service, or data flow that is receivable by one or more UEs 115. For example, an MBS session may refer to any signaling associated with video (e.g., live stream video or television broadcasts), radio (e.g., radio broadcasts), or public alerts. Further, an MBS session may be associated with an MBS session context, which may include or specify one or more characteristics or configurations associated with the MBS session. For example, an MBS session context may include an identifier for the MBS session (e.g., an MBS session ID). Additionally or alternatively, an MBS session context may include a list of data or traffic flows associated with the MBS session and a QoS profile (e.g., a QoS parameter, such as a QoS indicator) for each data or traffic flow in the list of data or traffic flows.

Additionally or alternatively, an MBS session context may include a resource configuration for one or more radio bearers associated with the MBS session (which may be referred to herein as an MRB resource configuration). Such an MRB resource configuration may include a CSI-RS or beam configuration (e.g., a configuration of a directional communication beam or a spatial domain resource configuration) associated with the MBS session, a frequency domain resource configuration (e.g., a BWP configuration) associated with the MBS session, or a time domain resource configuration (e.g., a discontinuous reception (DRX) pattern or a slot pattern) associated with the MBS session. Additionally or alternatively, an MBS session context may include a protocol layer configuration for the one or more radio bearers associated with the MBS session. Such a protocol layer configuration may include or refer to an MRB protocol layers configuration for the PDCP, RLC, MAC, or physical (PHY) layers, or any combination thereof. Further, an MBS session context may include any additional characteristics, parameters, or configurations associated with multicast or broadcast signaling, and may be equivalently referred to as a multicast configuration or a broadcast configuration.

A sharing or exchanging of such information that is included within the MBS session context between base stations may be useful in various use cases or scenarios, including in target cell selection in a handover procedure, a measurement configuration in a handover procedure (or a measurement configuration for deciding whether to perform a handover procedure), interference coordination, or system information block (SIB) construction. In handover, for example, if multiple target cells are radio qualified (e.g., if multiple cells satisfy one or more other constraints, thresholds, or parameters associated with a service type or channel quality associated with or requested by the UE 115-a), the base station 105-a (e.g., a source cell or base station) may prioritize cells providing the UE-desired MBS session if the base station 105-a has knowledge of the MBS sessions provided by other cells.

As such, exchanging MBS session context in Xn may enable the base station 105-a (e.g., the source cell or base station) to know the MBS session availability in neighbor cells. For example, if the base station 105-b is a potential target cell or base station for the UE 115-a and transmits MBS session context information 215 to the base station 105-a, the base station 105-a may prioritize or de-prioritize the base station 105-b in a handover procedure for the UE 115-a in accordance with the MBS session provided by the base station 105-b. In some examples, the base station 105-a may identify, based on the MBS session context information 215 provided by the base station 105-b, that the base station 105-b provides a same MBS session as an MBS session that is requested by the UE 115-a and may select the base station 105-b as the target cell or base station for the UE 115-a accordingly.

Additionally or alternatively, the base station 105-a may use the MBS session context information 215 provided by the base station 105-b for a measurement configuration. For example, if the MBS session provided by the base station 105-b includes MBSFN transmissions, the MBS coverage may be different from the cell coverage, which may result in different quality or signal strength measurements for unicast transmission and MBS transmissions. Accordingly, and as a result of receiving the MBS session context information 215 (which may include CSI-RS or beam information associated with the MBS session) from the base station 105-b, the base station 105-a may more accurately configure measurements, by the UE 115-a, of MBS session transmissions from the base station 105-b. In some implementations, the base station 105-a (e.g., a source cell) may take MBS signal quality into consideration, for example, in a handover procedure. In some aspects, intra-DU MBSFN may be supported transparently in terms of beam, and sharing the MBS session context information 215 with the base station 105-a may enhance such an MBSFN.

Additionally or alternatively, if MBSFN is used, neighboring cells of an MBSFN area (a geographic area over which a cell employs MBSFN) may bring or otherwise cause interference to the MBSFN. Similarly, some MBSFN signaling may interfere with unicast communication at those neighboring cells. For example, if the base station 105-a is communicating with the UE 115-a and the base station 105-b is providing an MBSFN relatively proximate to the base station 105-a or the UE 115-a, the communication between the base station 105-a and the UE 115-a and the MBSFN provided by the base station 105-b may potentially interfere with each other. In some implementations, the sharing of the MBS session context information 215 with the base station 105-a may enable the base station 105-a to make scheduling decisions or adjust previously-made scheduling decisions to avoid interference with MBSFN transmissions from the base station 105-b. In some aspects, the network may define a "reserved cell" for MBSFN neighbor cells to back-off for MBSFN communication, and including such (or similar) back-off information or instructions within the MBS session context information 215 may provide a more efficient interference avoidance mechanism.

Additionally or alternatively, the base station 105-a may use the MBS session context information 215 for SIB construction. For example, in some radio access technologies (e.g., such as in LTE), a SIB (e.g., SIB15) may include multimedia broadcast multicast service (MBMS) services in serving and neighboring frequencies and NR may define a similar mechanism for at least a broadcast mode. As such, in some implementations, the base station 105-a may modify or update its system information to reflect information relating to the MBS session provided by the base station 105-b (e.g., a neighboring cell) as a result of receiving the MBS session context information 215 from the base station 105-b. Such system information may also include information relating to the MBS session provided by the base station 105-a and potentially one or more other base stations 105. The UE 115-a may acquire the system information and use the acquired system information for various purposes, such as to provide UE assistance information (e.g., to request to be handed over to a different base station 105 if another base station 105 provides a more suitable MBS session than the base station 105-a).

In some cases, such as in cases in which the base station 105-a performs a handover of the UE 115-a to the base station 105-b, the base station 105-a may transfer an MBS UE context to the base station 105-b. However, such UE-associated signaling may be insufficient to support the various use cases described herein, as such MBS UE context information may be provided after a handover decision (such that the MBS session context of the base station 105-*b* is not taken into account in the target cell selection) and may not be conducive for interference management or SIB construction (as the MBS UE context may not convey all parameters or configurations that the base station 105-*b* may use). As such, in some implementations of the present disclosure, the base station 105-*b* may transmit the MBS session context information 215 for the MBS session supported by the base station 105-*b* to the base station 105-*a* using non-UE associated signaling over Xn or F1.

In some examples, the base station 105-*b* may include the MBS session context information 215 in an MBS Session Context IE and may include the MBS Session Context IE in a "Served Cell Information NR" IE. Such inclusion of the MBS session context information 215 within an IE or field of the "Served Cell Information NR" IE may facilitate the exchange of the MBS session context information 215 in an Xn or F1 setup procedure or an Xn or F1 update procedure, or both. Example contents of the "Served Cell Information NR" IE, which may contain or include cell configuration information of an NR cell that a neighboring node may use for the Xn AP interface, are shown in Table 1. Range bound information may be conveyed via maxnoofBPLMNs and may explain or indicate a maximum number of broadcast public land mobile networks (PLMNs) by a cell. In some aspects, maxnoofBPLMNs may be equal to 12.

TABLE 1

| IE/Group Name | Presence | Range | IE type and reference | Semantics description | Criticality | Assigned Criticality |
|---|---|---|---|---|---|---|
| NR-PCI | M | | INTEGER (0 . . . 1007, . . . ) | NR Physical Cell ID | — | |
| NR CGI | M | | 9.2.2.7 | | — | |
| TAC | M | | 9.2.2.5 | Tracking Area Code | — | |
| RANAC | O | | RAN Area Code 9.2.2.6 | | — | |
| Broadcast PLMNs | | 1 . . . <maxnoofBPLMNs> | | Broadcast PLMNs in SIB1 associated to the NR Cell Identity in the NR CGI IE. | — | |
| >PLMN Identity | M | | 9.2.2.4 | | — | |
| CHOICE NR-Mode-Info | M | | | | — | |
| >FDD | | | | | | |
| >>FDD Info | | 1 | | | | |
| >>>UL NR Frequency Info | M | | NR Frequency Info 9.2.2.19 | | — | |
| >>>DL NR Frequency Info | M | | NR Frequency Info 9.2.2.19 | | — | |
| >>>UL Transmission Bandwidth | M | | NR Transmission Bandwidth 9.2.2.20 | | — | |
| >>>DL Transmission Bandwidth | M | | NR Transmission Bandwidth 9.2.2.20 | | — | |
| >>>UL Carrier List | O | | NR Carrier List 9.2.2.63 | If included, the UL Transmission Bandwidth IE shall be ignored. | YES | ignore |
| >>>DL Carrier List | O | | NR Carrier List 9.2.2.63 | If included, the DL Transmission Bandwidth IE shall be ignored. | YES | ignore |
| >TDD | | | | | | |
| >>TDD Info | | 1 | | | | |
| >>>Frequency Info | M | | NR Frequency Info 9.2.2.19 | | — | |
| >>>Transmission Bandwidth | M | | NR Transmission Bandwidth 9.2.2.20 | | — | |
| >>>Intended TDD DL-UL Configuration NR | O | | 9.2.2.40 | | YES | ignore |
| >>>TDD UL-DL Configuration Common NR | O | | OCTET STRING | The tdd-UL-DL-ConfigurationCommon as defined in TS 38.331 [10] | YES | ignore |
| >>>Carrier List | O | | NR Carrier List 9.2.2.63 | If included, the Transmission Bandwidth IE shall be ignored. | YES | ignore |
| Measurement Timing Configuration | M | | OCTET STRING | Contains the MeasurementTiming Configuration inter-node message for the served cell, as defined in TS 38.331 [10]. | — | |
| Connectivity Support | M | | 9.2.2.28 | | — | |
| Broadcast PLMN Identity Info List NR | | 0 . . . <maxnoofBPLMNs> | | This IE corresponds to the PLMN-IdentityInfoList IE in SIB1 as specified in TS 38.331 [8]. All PLMN Identities and associated information contained in the PLMN- | YES | ignore |

TABLE 1-continued

| IE/Group Name | Presence | Range | IE type and reference | Semantics description | Criticality | Assigned Criticality |
|---|---|---|---|---|---|---|
| | | | | IdentityInfoList IE are included and provided in the same order as broadcast in SIB1. | | |
| >Broadcast PLMNs | | 1 . . . <maxnoofBPLMNs> | | Broadcast PLMNs in SIB1 associated to the NR Cell Identity IE. | — | |
| >>PLMN Identity | M | | 9.2.2.4 | | — | |
| >TAC | M | | 9.2.2.5 | | — | |
| >NR Cell Identity | M | | BIT STRING (SIZE(36)) | | — | |
| >RANAC | O | | RAN Area Code 9.2.2.6 | | — | |
| >Configured TAC Indication | O | | 9.2.2.39a | NOTE: This IE is associated with the TAC in the Broadcast PLMN Identity Info List NR IE | YES | ignore |
| >NPN Broadcast Information | O | | 9.2.2.71 | If this IE is included the content of the Broadcast PLMNs IE in the Broadcast PLMN Identity Info List NR IE is ignored. | YES | reject |
| Configured TAC Indication | O | | 9.2.2.39a | NOTE: This IE is associated with the TAC on top-level of the Served Cell Information NR IE | YES | ignore |
| NPN Broadcast Information | O | | 9.2.2.71 | If this IE is included the content of the Broadcast PLMNs IE in the top Served Cell Information NR IE is ignored. | YES | reject |
| SSB Positions In Burst | O | | 9.2.2.64 | | YES | ignore |
| NR Cell PRACH Configuration | O | | OCTET STRING | Containing 9.3.1.139 NR Cell PRACH Configuration as of TS 38.473 [41]. | YES | ignore |
| CSI-RS Transmission Indication | O | | ENUMERATED (activated, deactivated, . . . ) | This IE indicates the CSI-RS transmission status of the given cell. | YES | ignore |
| MBS Session Context List | | 0 . . . <maxnoofMBSSessions> | | Broadcast PLMNs in SIB1 associated to the NR Cell Identity in the NR CGI IE. | YES | ignore |
| >MBS Session Context | M | | | RRC container or a XnAP/F1AP IE | — | |

In some implementations, the MBS session context information 215 (e.g., the MBS Session Context IE) may include MBS service availability information, MRB resource configuration information, and MBSFN configuration information (if the base station 105-b supports an MBS session associated with MBSFN communication). In some aspects, the MBS service availability information, MRB resource configuration information, and MBSFN configuration information may each be carried by separate IEs or parameters within the MBS Session Context IE.

As described herein, to indicate the MBS service availability, the base station 105-b may transmit an MBS session ID associated with the MBS session(s) supported by the base station 105-b. Further, the MRB resource configuration may include an indication of a CSI-RS or beam, a frequency domain resource (e.g., a BWP or frequency range allocation), and a time domain resource (e.g., a DRX or slot pattern configuration) that are each associated with the MBS session supported by the base station 105-b. The MBSFN configuration may include an indication of a CSI-RS or beam, a geographic region or area, a frequency domain resource (e.g., a BWP or frequency range allocation) or a time domain resource (e.g., a DRX or slot pattern configuration) that are each associated with an MBSFN of the MBS session supported by the base station 105-b.

In some examples, the MBSFN configuration (e.g., the MBSFN configuration IE) may additionally or alternatively include a back-off request and a back-off cell and beam list for MBSFN neighbor cells to back-off for an MBSFN transmission. For example, the base station 105-b may have a scheduled MBSFN transmission and if communication between the base station 105-a and the UE 115-a may potentially interfere with the MBSFN transmission, the base station 105-b may request the base station 105-a to back-off (e.g., reduce transmission power or refrain from transmitting or scheduling transmissions) in accordance with the back-off request (which may be a field or a bit indicating the request for the base station 105-a to back-off) and the back-off cell and beam list. The back-off cell and beam list may include cells or beams, or both, over which the base station 105-a may avoid transmitting or scheduling transmissions. In some examples, the base station 105-a may implement such interference avoidance for transmissions that are scheduled to use time and frequency resources that overlap with or are proximate to the resources used by the MBSFN transmission from the base station 105-b.

In examples in which the network supports a measurement configuration for MBS or MBSFN beams, the base station 105-b may additionally transmit beam configuration information indicating which beams operated by the base station 105-b are used for MBS or MBSFN transmissions. The base station 105-a and the base station 105-b may exchange beam configuration information using an inter-node RRC message MeasurementTimingConfiguration, but, in some cases, the "Measurement Timing Configuration" IE that the base stations 105 transmit via Xn application protocol (AP) and F1 AP may not include an indication of which synchronization signal blocks (SSBs) or beams are used for MBSFN, which may prohibit any measurement configuration that is specifically for MBSFN transmissions (as may be useful if MBSFN coverage differs from cell coverage). Accordingly, in some implementations, the base station 105-b may include an indication in the RRC MeasurementTimingConfiguration IE to indicate which beam (as identified by one or more SSBs or CSI-RSs) is used for MBSFN communication.

For example, the MeasurementTimingConfiguration IE may include a csi-RS-Config IE including a csi-RS-SubcarrierSpacing parameter, a csi-RS-CellMobility parameter, and a refSSBFreq parameter and may be extended to include an IsMBSFN IE or parameter. The IsMBSFN parameter, which may be an optional IE or parameter, may be set to "true" if the associated or corresponding beam is used for MBSFN transmissions and may be either set to "false" or not included if the associated or corresponding beam is not used for MBSFN transmissions.

The base station 105-b may further include an IsMBSFN IE or parameter as an optional IE or parameter in a MeasTiming IE. For example, the MeasTiming IE may include a frequencyAndTiming IE, which may in turn include a carrierFreq parameter, an ssbSubcarrierSpacing parameter, an ssb-MeasurementTimingConfiguration parameter, and an ss-RSSI-Measurement parameter. The MeasTiming IE may also include an optional ssb-ToMeasure IE or parameter and an optional physCellId IE or parameter. As such, the base station 105-b may indicate which SSBs or CSI-RSs are associated with the directional beam that the base station 105-b uses for MBSFN transmissions. Accordingly, upon reception and decoding of the IsMBSFN IE or parameter, the base station 105-a may configure the UE 115-a to measure SSBs or CSI-RSs that are associated with beams that are used for MBSFN transmissions from the base station 105-b.

As such, the base station 105-a may obtain knowledge of the MBS session context supported or provided by the base station 105-b via the MBS Session Context IE in the "Served Cell Information NR" IE and via the MeasurementTimingConfiguration IE, and may communicate with the UE 115-a in accordance with the obtained knowledge. In some examples, the base station 105-a may transmit control signaling, such as a control message 220, to the UE 115-a as a result of receiving the MBS session context from the base station 105-b. The base station 105-a may transmit the control message 220 over a communication link 210 (e.g., an access link) and the control message 220 may vary in accordance with a scenario or use case. Further, although described and illustrated as a single control message 220, the control message 220 may equivalently refer to any amount of control signaling including any quantity of messages that the base station 105-a transmits to the UE 115-a as a result of obtaining knowledge of the MBS session context for the MBS session supported by the base station 105-a.

In some examples, for instance, the base station 105-a may select the base station 105-b as a target cell in a handover procedure for the UE 115-a as a result of the base station 105-b supporting an MBS session that is requested by the UE 115-a. In such examples, the control message 220 may include signaling associated with the handover procedure for the UE 115-a from the base station 105-a to the base station 105-b. Likewise, the base station 105-a may handover the UE 115-a to the base station 105-b.

In some other examples, the base station 105-a may configure an MBS measurement, such as an MBSFN measurement, for the UE 115-a to obtain signal quality or strength metrics for the MBS session provided by the base station 105-b. In such examples, the control message 220 may include signaling configuring the measurement to be performed by the UE 115-a and may include an indication of which beams the base station 105-b uses for MBS or MBSFN transmissions. Accordingly, the UE 115-a may perform the measurements and, if the measurements by the UE 115-a exceed a threshold or are greater than measurements obtained for transmissions from the base station 105-a, the base station 105-a may elect to handover the UE 115-a to the base station 105-b.

In some other examples, the base station 105-a may use the MBS session context from the base station 105-b for interference avoidance and, in such examples, the control message 220 may include signaling scheduling communication between the UE 115-a and the base station 105-a to avoid interference with MBS or MBSFN transmissions from the base station 105-b. Further, the base station 105-a may continuously modify or update communication between the UE 115-a and the base station 105-a to avoid interference with MBS or MBSFN transmissions as the base station 105-a obtains updated MBS session context information 215 from the base station 105-b.

In some other examples, the base station 105-a may use the MBS session context from the base station 105-b for SIB construction (e.g., the base station 105-a may include the MBS session context for the MBS session supported by the base station 105-b in the system information that the base station 105-a broadcasts). In such examples, the control message 220 may include the SIB including the MBS session context for the MBS session supported by the base station 105-b. Such a modification or update to the system information associated with the base station 105-a may provide the UE 115-a with greater network knowledge and an ability to provide more informed UE assistance information (e.g., if the UE 115-a determines that the base station 105-b provides an MBS session more closely matching or aligning with an MBS session requested by the UE 115-a).

Figure 3:
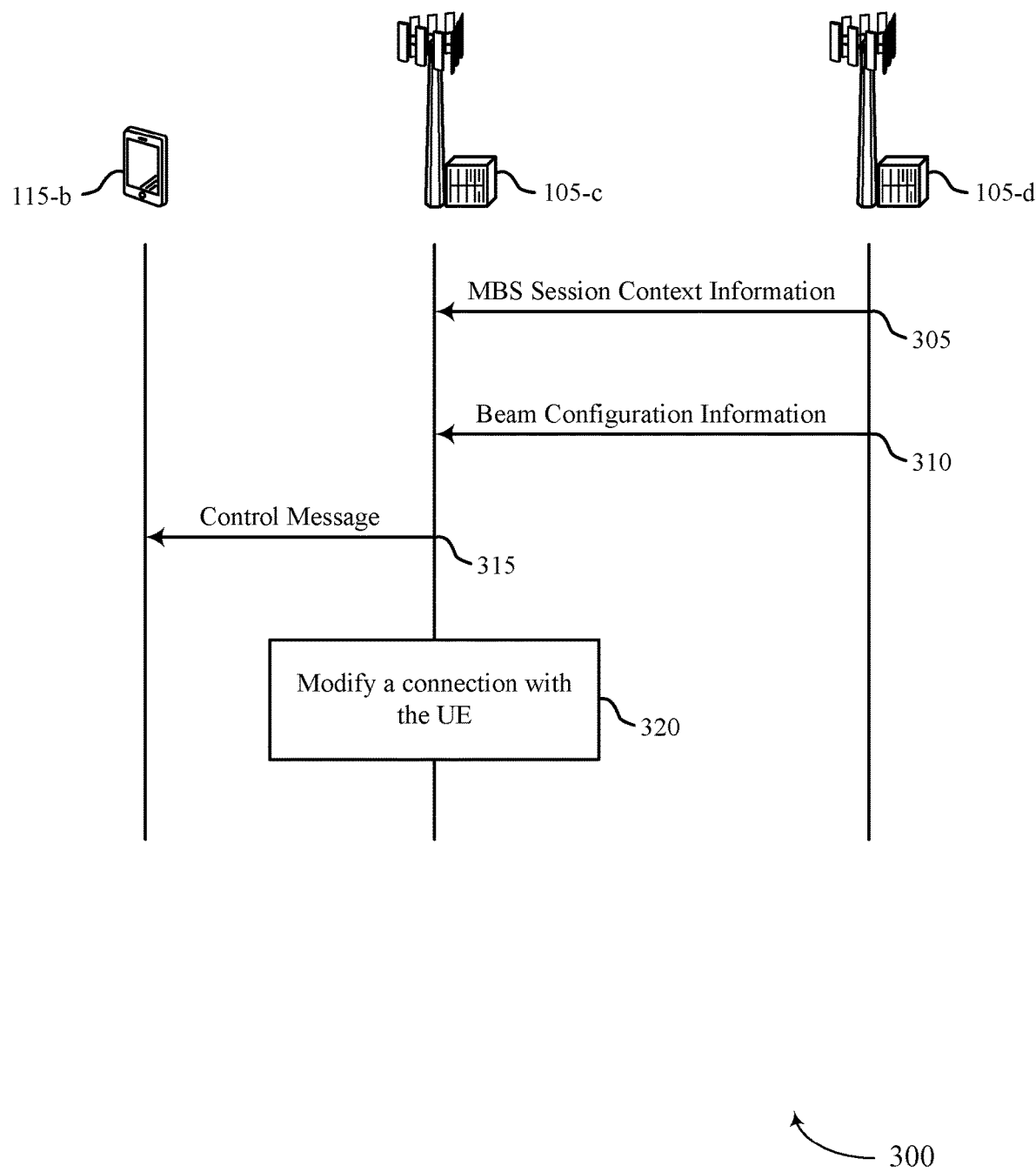
FIG. 3 shows an example of a process flow that supports MBS configuration exchange for mobility, single-frequency network and interference coordination in accordance with aspects of the present disclosure.

FIG. 3 illustrates an example of a process flow 300 that supports MBS configuration exchange for mobility, single-frequency network and interference coordination in accordance with aspects of the present disclosure. The process flow 300 may implement or be implemented to realize aspects of the wireless communications system 100 or the wireless communications system 200. For example, the process flow 300 may illustrate communication between a UE 115-b, a base station 105-c, and a base station 105-d, which may be examples of corresponding devices described herein, including with reference to FIGS. 1 and 2. In some examples, the base station 105-c may receive MBS session context information for an MBS session supported by or otherwise associated with the base station 105-d and may communicate with the UE 115-*b* in accordance with the MBS session context of the base station 105-*d*.

In the following description of the process flow 300, the operations may be performed (e.g., reported or provided) in a different order than the order shown, or the operations performed by the example devices may be performed in different orders or at different times. For example, specific operations may also be left out of the process flow 300, or other operations may be added to the process flow 300. Further, although some operations or signaling may be shown to occur at different times for discussion purposes, these operations may actually occur at the same time.

At 305, the base station 105-*c* (e.g., a first base station) may receive, from the base station 105-*d* (e.g., a second base station) via a backhaul link, MBS session context information for an MBS session associated with the base station 105-*d*. In some examples, the base station 105-*d* may transmit the MBS session context information to the base station 105-*c* via an MBS Session Context IE within a "Served Cell Information NR" IE and the MBS session context information may include one or more of an MBS service availability, an MRB resource configuration, or an MBSFN configuration, as described in more detail with reference to FIG. 2. The backhaul link may include or be an example of an Xn interface or an F1 interface, as also described in more detail with reference to FIG. 2.

At 310, the base station 105-*c* may receive, from the base station 105-*d*, beam configuration information including, for each beam associated with the beam configuration information, an indication of whether that beam is used for an MBSFN of the MBS session associated with the base station 105-*d*. In some examples, the beam configuration information may be an example of or include a MeasurementTimingConfiguration IE and the base station 105-*d* may convey the indication of whether a given beam is used for the MBSFN via a IsMBSFN IE or parameter, as described in more detail with reference to FIG. 2.

At 315, the base station 105-*c* may transmit a control message to the UE 115-*b* in accordance with the MBS session associated with the base station 105-*d* and based on a coordination between the base station 105-*c* and the base station 105-*d* or between a first component of the base station 105-*c* and a second component of the base station 105-*c*, or both. In some examples, such coordination between the base station 105-*c* and the base station 105-*d* may include a comparing, by the base station 105-*c*, of the MBS session associated with the base station 105-*d* and an MBS session associated with the base station 105-*c*. As such, the base station 105-*c* may obtain more complete network knowledge and may make connection or scheduling decisions in line with such more complete network knowledge.

In some examples, the base station 105-*c* may feature, operate as, or otherwise support multiple components (which may be equivalently referred to as wireless roles or network functionalities), and coordination between such multiple components may include a relaying or an exchanging of the received MBS session context information between the multiple components of the base station 105-*c*. For example, such coordination may refer to a signaling or a relaying of information between any two or more of a DU, a CU, an RU, or a gNB associated with the base station 105-*c*. Further, such coordination may also include coordination between one or more components of the base station 105-*d* or coordination between one or more components of the base station 105-*c* and one or more components of the base station 105-*d*. The control message (which may be a single message or may include or refer to multiple messages) may vary depending on a scenario or use case, as described with reference to FIG. 2.

For example, the control message may include signaling associated with a handover of the UE 115-*b* from the base station 105-*c* to the base station 105-*d* based on matching the MBS session context information for the MBS session associated with the base station 105-*d* to a multicast-broadcast service request of the UE 115-*b*. Additionally or alternatively, the control message may include signaling configuring a measurement, by the UE 115-*b*, of the MBS session associated with the base station 105-*d*. Additionally or alternatively, the control message may include signaling scheduling communication between the UE 115-*b* and the base station 105-*c* to avoid interference with the MBS session associated with the base station 105-*d*. Additionally or alternatively, the control message may include a SIB including information relating to the MBS session context information.

At 320, the base station 105-*c* may modify a connection between the UE 115-*b* and the base station 105-*c* based on the control message and the received MBS session context information. The modification of the connection between the UE 115-*b* and the base station 105-*c* may vary or refer to different procedures depending on the scenario or use case.

For instance, in examples in which the control message includes signaling associated with a handover, the base station 105-*c* may modify the connection by performing the handover of the UE 115-*b* from the base station 105-*c* to the base station 105-*d*. Additionally or alternatively, in examples in which the control message includes signaling configuring a measurement of the MBS session associated with the base station 105-*d*, the base station 105-*c* may modify the connection by performing the handover of the UE 115-*b* from the base station 105-*c* to the base station 105-*d* based on the measurement. For example, if the UE 115-*b* measures that the base station 105-*d* provides a greater signal quality or receive strength than the base station 105-*c*, the base station 105-*c* may elect to handover the UE 115-*b* to the base station 105-*d*. Alternatively, if the UE 115-*b* measures that the base station 105-*d* provides a lesser signal quality or receive strength than the base station 105-*c*, the base station 105-*c* may refrain from performing the handover procedure and may maintain the connection with the UE 115-*b*.

Additionally or alternatively, in examples in which the control message includes signaling scheduling communication between the UE 115-*b* and the base station 105-*c* to avoid interference with the MBS session associated with the base station 105-*d*, the base station 105-*c* may modify the connection with the UE 115-*b* by modifying the scheduling of the communication between the UE 115-*b* and the base station 105-*c* to avoid the interference with the MBS session associated with the base station 105-*d*. Additionally or alternatively, in examples in which the control message includes a SIB including information relating to the received MBS session context information, the base station 105-*c* may modify the connection between the UE 115-*b* and the base station 105-*c* by modifying the system information associated with the base station 105-*c*. Further, in such examples in which the control message includes the SIB, the base station 105-*c* may, in some implementations, modify the connection by electing to handover the UE 115-*b* to the base station 105-*d* (e.g., as a result of UE assistance information responsive to the SIB including the MBS session context information for the base station 105-*d*) or may modify one or more other connection parameters.

Figure 4:
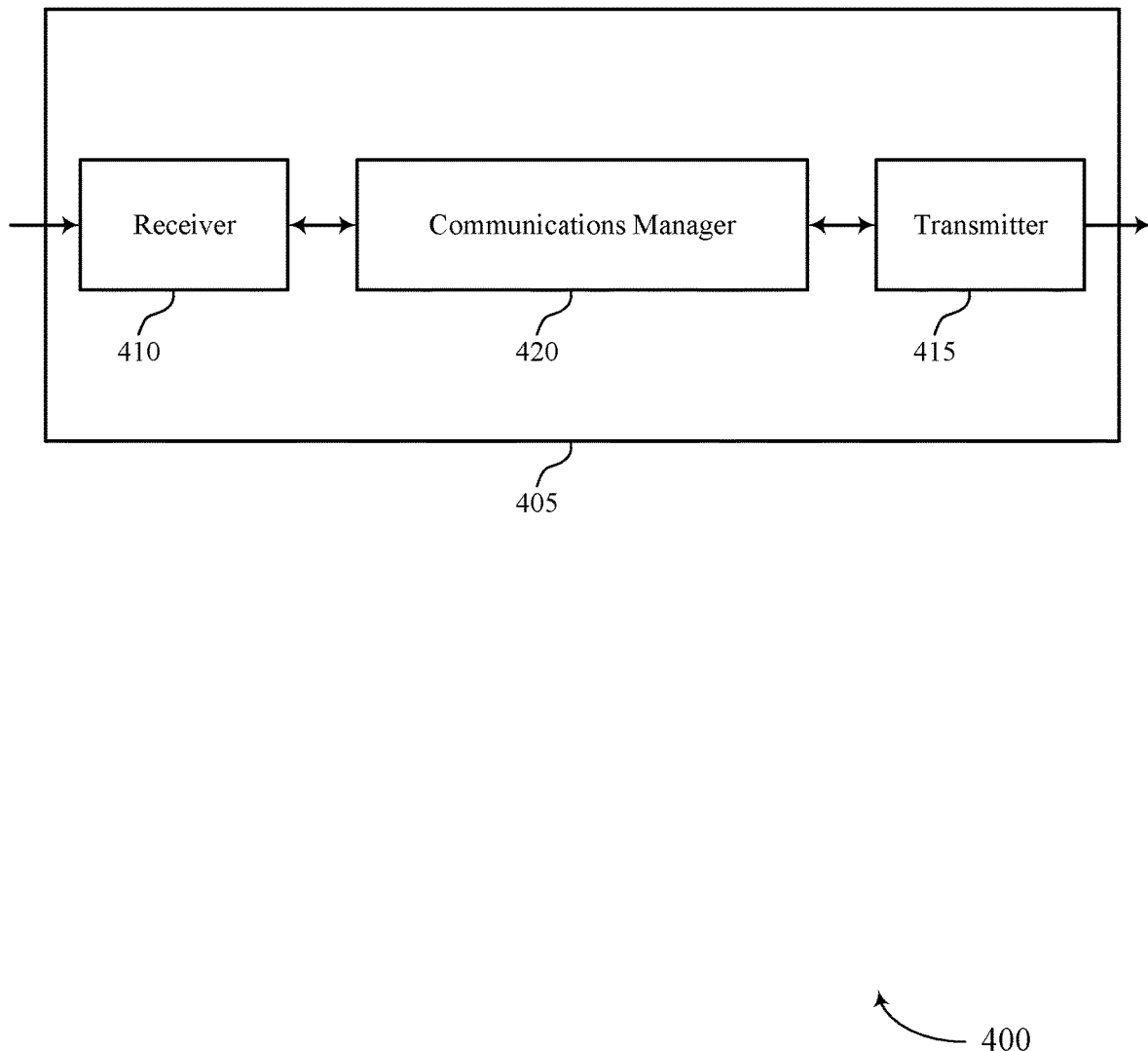
FIGS. 4 and 5 show block diagrams of devices that support MBS configuration exchange for mobility, single-frequency network and interference coordination in accordance with aspects of the present disclosure.

FIG. 4 shows a block diagram 400 of a device 405 that supports MBS configuration exchange for mobility, single-frequency network and interference coordination in accordance with aspects of the present disclosure. The device 405 may be an example of aspects of one or more components of a base station 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to MBS configuration exchange for mobility, single-frequency network and interference coordination). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to MBS configuration exchange for mobility, single-frequency network and interference coordination). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of MBS configuration exchange for mobility, single-frequency network and interference coordination as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a first network node in accordance with examples as disclosed herein. For example, the communications manager 420 may be configured as or otherwise support a means for receiving, from a second network node, MBS session context information for a multicast-broadcast session associated with the second network node. The communications manager 420 may be configured as or otherwise support a means for transmitting a control message to a UE in accordance with the multicast-broadcast session associated with the second network node and based on a coordination between the first network node and the second network node. The communications manager 420 may be configured as or otherwise support a means for modifying a connection between the UE and the first network node based on the control message and the received MBS session context information.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, and more efficient utilization of communication resources.

Figure 5:
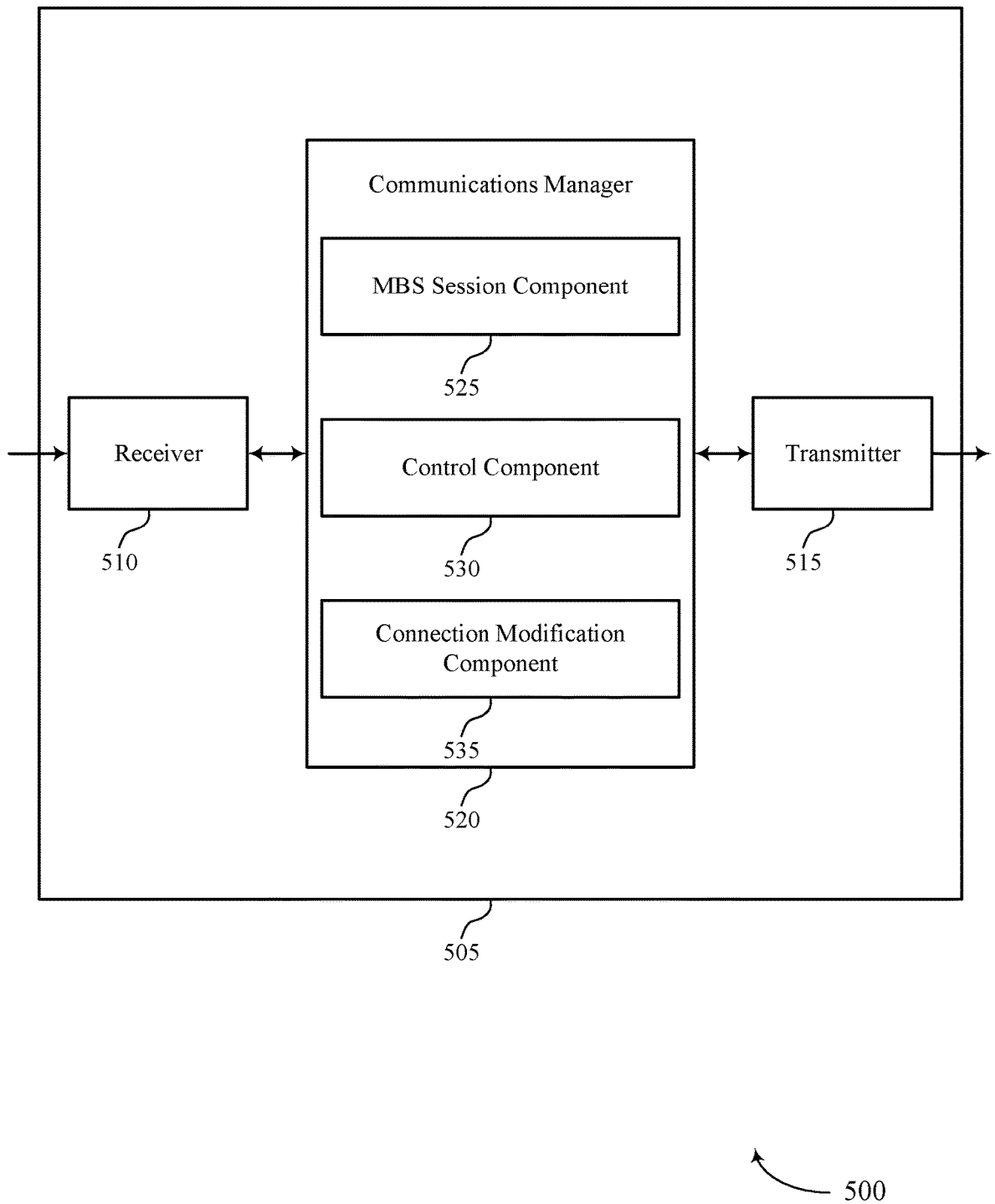

FIG. 5 shows a block diagram 500 of a device 505 that supports MBS configuration exchange for mobility, single-frequency network and interference coordination in accordance with aspects of the present disclosure. The device 505 may be an example of aspects of a device 405 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to MBS configuration exchange for mobility, single-frequency network and interference coordination). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to MBS configuration exchange for mobility, single-frequency network and interference coordination). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of MBS configuration exchange for mobility, single-frequency network and interference coordination as described herein. For example, the communications manager 520 may include an MBS session component 525, a control component 530, a connection modification component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first network node in accordance with examples as disclosed herein. The MBS session component 525 may be configured as or otherwise support a means for receiving, from a second network node, MBS session context information for a multicast-broadcast session associated with the second network node. The control component 530 may be configured as or otherwise support a means for transmitting a control message to a UE in accordance with the multicast-broadcast session associated with the second network node and based on a coordination between the first network node and the second network node. The connection modification component 535 may be configured as or otherwise support a means for modifying a connection between the UE and the first network node based on the control message and the received MBS session context information.

Figure 6:
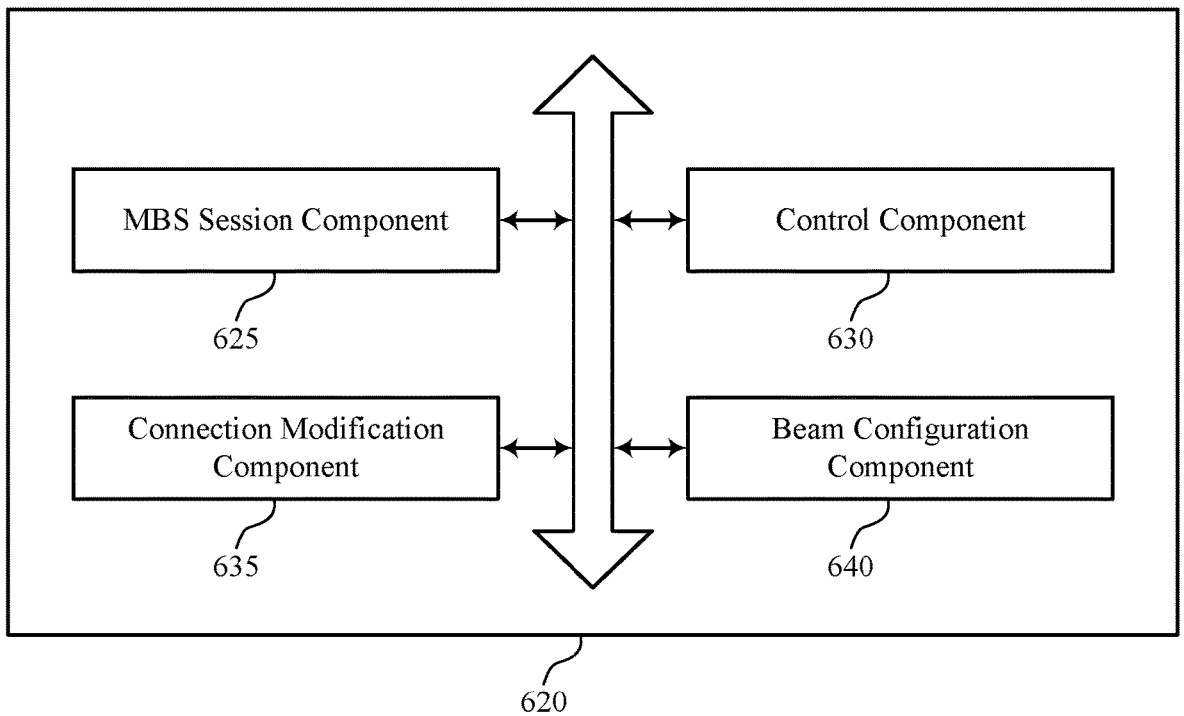
FIG. 6 shows a block diagram of a communications manager that supports MBS configuration exchange for mobility, single-frequency network and interference coordination in accordance with aspects of the present disclosure.

FIG. 6 shows a block diagram 600 of a communications manager 620 that supports MBS configuration exchange for mobility, single-frequency network and interference coordination in accordance with aspects of the present disclosure. The communications manager 620 may be an example of aspects of a communications manager 420, a communications manager 520, or both, as described herein. The communications manager 620, or various components thereof, may be an example of means for performing various aspects of MBS configuration exchange for mobility, single-frequency network and interference coordination as described herein. For example, the communications manager 620 may include an MBS session component 625, a control component 630, a connection modification component 635, a beam configuration component 640, or any combination thereof. Each of these components may communicate, directly or indirectly, with one another (e.g., via one or more buses).

The communications manager 620 may support wireless communication at a first network node in accordance with examples as disclosed herein. The MBS session component 625 may be configured as or otherwise support a means for receiving, from a second network node, MBS session context information for a multicast-broadcast session associated with the second network node. The control component 630 may be configured as or otherwise support a means for transmitting a control message to a UE in accordance with the multicast-broadcast session associated with the second network node and based on a coordination between the first network node and the second network node. The connection modification component 635 may be configured as or otherwise support a means for modifying a connection between the UE and the first network node based on the control message and the received MBS session context information.

In some examples, the beam configuration component 640 may be configured as or otherwise support a means for receiving, from the second network node, beam configuration information including, for each beam associated with the beam configuration information, an indication of whether that beam is used for an MBSFN of the multicast-broadcast session associated with the second network node.

In some examples, the MBS session context information includes an MBS availability for the multicast-broadcast session associated with the second network node, an MRB resource configuration for the multicast-broadcast session associated with the second network node, and an MBSFN configuration for an MBSFN of the multicast-broadcast session associated with the second network node.

In some examples, the MBS availability includes a session identifier associated with the multicast-broadcast session associated with the second network node.

In some examples, the multicast-broadcast radio bearer resource configuration includes an indication of a directional beam, a frequency domain resource configuration, and a time domain resource configuration associated with the multicast-broadcast session associated with the second network node.

In some examples, the MBSFN configuration includes an indication of a directional beam, a geographic area, a frequency domain resource configuration, and a time domain resource configuration associated with the MBSFN of the multicast-broadcast session associated with the second network node.

In some examples, the MBSFN configuration includes a back-off request and at least one of a cell list or a beam list for back-off by the first network node.

In some examples, the control message to the UE includes signaling associated with a handover of the UE from the first network node to the second network node based on matching the MBS session context information for the multicast-broadcast session associated with the second network node to a multicast-broadcast service request of the UE. In some examples, modifying the connection between the UE and the first network node includes performing the handover of the UE from the first network node to the second network node.

In some examples, the connection modification component 635 may be configured as or otherwise support a means for selecting the second network node as a target base station for the handover of the UE based on the matching of the MBS session context information for the multicast-broadcast session associated with the second network node to the multicast-broadcast service request of the UE.

In some examples, the control message to the UE includes signaling configuring a measurement, by the UE, of the multicast-broadcast session associated with the second network node. In some examples, modifying the connection between the UE and the first network node includes performing a handover of the UE from the first network node to the second network node based on the measurement by the UE.

In some examples, the control message to the UE includes signaling scheduling communication between the UE and the first network node to avoid interference with the multicast-broadcast session associated with the second network node. In some examples, modifying the connection between the UE and the first network node includes modifying the scheduling of the communication between the UE and the first network node to avoid the interference with the multicast-broadcast session associated with the second network node.

In some examples, the control message to the UE includes a SIB including information relating to the received MBS session context information. In some examples, modifying the connection between the UE and the first network node includes modifying system information associated with the first network node to include the information relating to the received MBS session context information.

In some examples, the coordination between the first network node and the second network node includes a comparing, by the first network node, of the multicast-broadcast session associated with the second network node with a multicast-broadcast session associated with the first network node and the coordination between the first component of the first network node and the second component of the first network node, or both, includes a relaying of the received multicast-broadcast services session context information between the first component and the second component.

Figure 7:
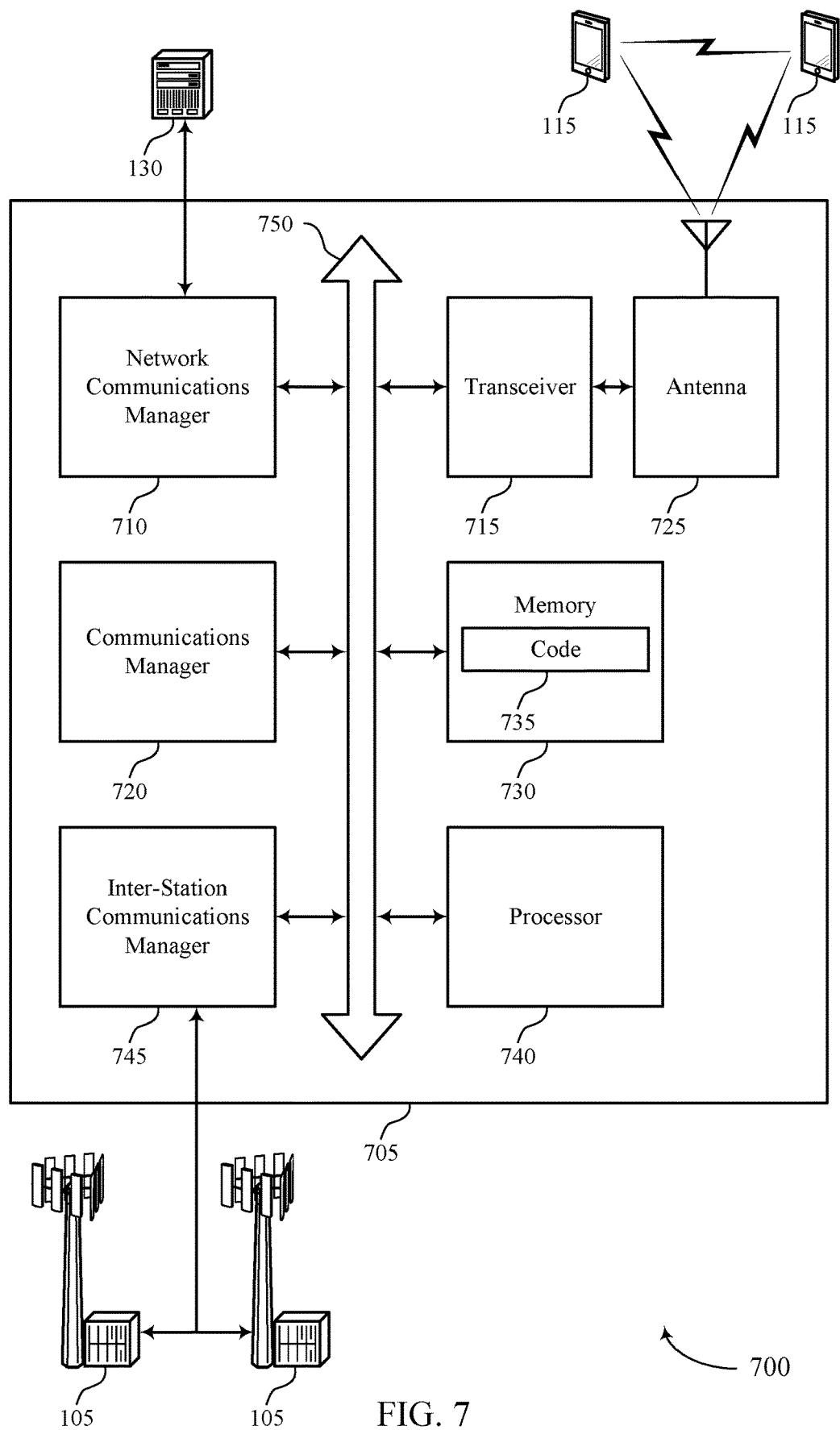
FIG. 7 shows a diagram of a system including a device that supports MBS configuration exchange for mobility, single-frequency network and interference coordination in accordance with aspects of the present disclosure.

FIG. 7 shows a diagram of a system 700 including a device 705 that supports MBS configuration exchange for mobility, single-frequency network and interference coordination in accordance with aspects of the present disclosure. The device 705 may be an example of or include the components of a device 405, a device 505, or a base station 105 as described herein. The device 705 may communicate wirelessly with one or more base stations 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random-access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic input-output (I/O) system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting MBS configuration exchange for mobility, single-frequency network and interference coordination). For example, the device 705 or a component of the device 705 may include a processor 740 and memory 730 coupled to the processor 740, the processor 740 and memory 730 configured to perform various functions described herein.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

The communications manager 720 may support wireless communication at a first network node in accordance with examples as disclosed herein. For example, the communications manager 720 may be configured as or otherwise support a means for receiving, from a second network node, MBS session context information for a multicast-broadcast session associated with the second network node. The communications manager 720 may be configured as or otherwise support a means for transmitting a control message to a UE in accordance with the multicast-broadcast session associated with the second network node and based on a coordination between the first network node and the second network node. The communications manager 720 may be configured as or otherwise support a means for modifying a connection between the UE and the first network node based on the control message and the received MBS session context information.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of MBS configuration exchange for mobility, single-frequency network and interference coordination as described herein, or the processor 740 and the memory 730 may be otherwise configured to perform or support such operations.

Figure 8:
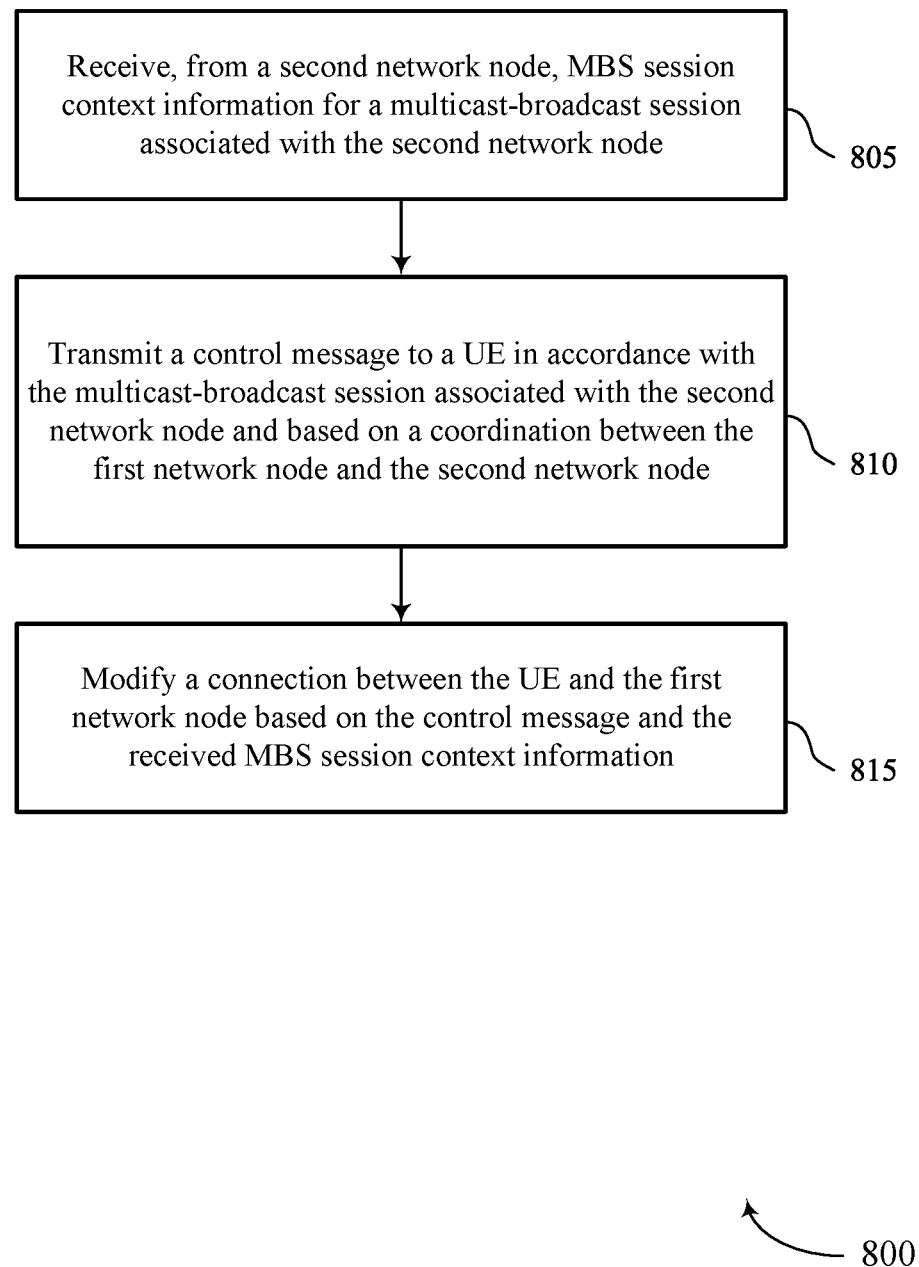
FIGS. 8 and 9 show flowcharts illustrating methods that support MBS configuration exchange for mobility, single-frequency network and interference coordination in accordance with aspects of the present disclosure.

FIG. 8 shows a flowchart illustrating a method 800 that supports MBS configuration exchange for mobility, single-frequency network and interference coordination in accordance with aspects of the present disclosure. The operations of the method 800 may be implemented by a base station or its components as described herein. For example, the operations of the method 800 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 805, the method may include receiving, from a second network node, MBS session context information for a multicast-broadcast session associated with the second network node. The operations of 805 may be performed in accordance with examples as disclosed herein. In some examples, aspects of the operations of 805 may be performed by an MBS session component 625 as described with reference to FIG. 6.

At 810, the method may include transmitting a control message to a UE in accordance with the multicast-broadcast session associated with the second network node and based on a coordination between the first network node and the second network node. The operations of 810 may be performed in accordance with examples as disclosed herein. In some examples, aspects of the operations of 810 may be performed by a control component 630 as described with reference to FIG. 6.

At 815, the method may include modifying a connection between the UE and the first network node based on the control message and the received MBS session context information. The operations of 815 may be performed in accordance with examples as disclosed herein. In some examples, aspects of the operations of 815 may be performed by a connection modification component 635 as described with reference to FIG. 6.

Figure 9:
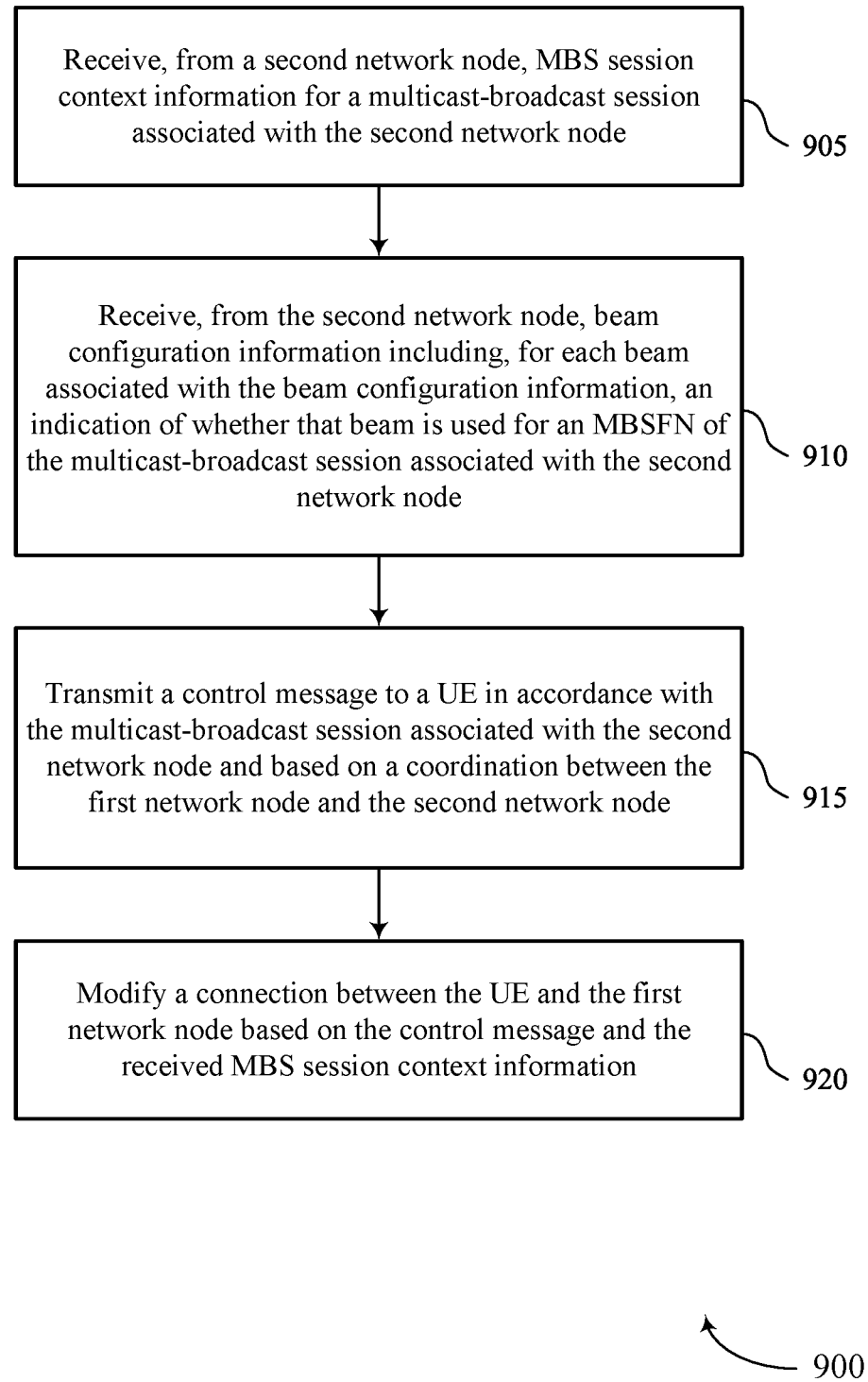

FIG. 9 shows a flowchart illustrating a method 900 that supports MBS configuration exchange for mobility, single-frequency network and interference coordination in accordance with aspects of the present disclosure. The operations of the method 900 may be implemented by a base station or its components as described herein. For example, the operations of the method 900 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 905, the method may include receiving, from a second network node, MBS session context information for a multicast-broadcast session associated with the second network node. The operations of 905 may be performed in accordance with examples as disclosed herein. In some examples, aspects of the operations of 905 may be performed by an MBS session component 625 as described with reference to FIG. 6.

At 910, the method may include receiving, from the second network node, beam configuration information including, for each beam associated with the beam configuration information, an indication of whether that beam is used for an MBSFN of the multicast-broadcast session associated with the second network node. The operations of 910 may be performed in accordance with examples as disclosed herein. In some examples, aspects of the operations of 910 may be performed by a beam configuration component 640 as described with reference to FIG. 6.

At 915, the method may include transmitting a control message to a UE in accordance with the multicast-broadcast session associated with the second network node and based on a coordination between the first network node and the second network node. The operations of 915 may be performed in accordance with examples as disclosed herein. In some examples, aspects of the operations of 915 may be performed by a control component 630 as described with reference to FIG. 6.

At 920, the method may include modifying a connection between the UE and the first network node based on the control message and the received MBS session context information. The operations of 920 may be performed in accordance with examples as disclosed herein. In some examples, aspects of the operations of 920 may be performed by a connection modification component 635 as described with reference to FIG. 6.

The following provides an overview of aspects of the present disclosure:

Aspect 1: A method for wireless communication at a first network node, comprising: receiving, from a second network node, MBS session context information for a multicast-broadcast session associated with the second network node; transmitting a control message to a UE in accordance with the multicast-broadcast session associated with the second network node and based at least in part on a coordination between the first network node and the second network node; and modifying a connection between the UE and the first network node based at least in part on the control message and the received MBS session context information.

Aspect 2: The method of aspect 1, further comprising: receiving, from the second network node, beam configuration information including, for each beam associated with the beam configuration information, an indication of whether that beam is used for a multicast-broadcast single-frequency network of the multicast-broadcast session associated with the second network node.

Aspect 3: The method of any of aspects 1 or 2, wherein the MBS session context information includes an MBS availability for the multicast-broadcast session associated with the second network node; an MRB resource configuration for the multicast-broadcast session associated with the second network node; and a multicast-broadcast single-frequency network configuration for a multicast-broadcast single-frequency network of the multicast-broadcast session associated with the second network node.

Aspect 4: The method of aspect 3, wherein the MBS availability includes a session identifier associated with the multicast-broadcast session associated with the second network node.

Aspect 5: The method of any of aspects 3 or 4, wherein the MRB resource configuration includes an indication of a directional beam, a frequency domain resource configuration, and a time domain resource configuration associated with the multicast-broadcast session associated with the second network node.

Aspect 6: The method of any of aspects 3 through 5, wherein the multicast-broadcast single-frequency network configuration includes an indication of a directional beam, a geographic area, a frequency domain resource configuration, and a time domain resource configuration associated with the multicast-broadcast single-frequency network of the multicast-broadcast session associated with the second network node.

Aspect 7: The method of any of aspects 3 through 6, wherein the multicast-broadcast single-frequency network configuration includes a back-off request and at least one of a cell list or a beam list for back-off by the first network node.

Aspect 8: The method of any of aspects 1 through 7, wherein the control message to the UE comprises signaling associated with a handover of the UE from the first network node to the second network node based at least in part on matching the MBS session context information for the multicast-broadcast session associated with the second network node to a multicast-broadcast service request of the UE; and modifying the connection between the UE and the first network node comprises performing the handover of the UE from the first network node to the second network node.

Aspect 9: The method of aspect 8, further comprising: selecting the second network node as a target base station for the handover of the UE based at least in part on the matching of the MBS session context information for the multicast-broadcast session associated with the second network node to the multicast-broadcast service request of the UE.

Aspect 10: The method of any of aspects 1 through 7, wherein the control message to the UE comprises signaling configuring a measurement, by the UE, of the multicast-broadcast session associated with the second network node; and modifying the connection between the UE and the first network node comprises performing a handover of the UE from the first network node to the second network node based at least in part on the measurement by the UE.

Aspect 11: The method of any of aspects 1 through 7, wherein the control message to the UE comprises signaling scheduling communication between the UE and the first network node to avoid interference with the multicast-broadcast session associated with the second network node; and modifying the connection between the UE and the first network node comprises modifying the scheduling of the communication between the UE and the first network node to avoid the interference with the multicast-broadcast session associated with the second network node.

Aspect 12: The method of any of aspects 1 through 7, wherein the control message to the UE comprises a SIB including information relating to the received MBS session context information; and modifying the connection between the UE and the first network node comprises modifying system information associated with the first network node to include the information relating to the received MBS session context information.

Aspect 13: The method of any of aspects 1 through 11, wherein the coordination between the first network node and the second network node comprises a comparing, by the first network node, of the multicast-broadcast session associated with the second network node with a multicast-broadcast session associated with the first network node and the coordination between the first component of the first network node and the second component of the first network node, or both, comprises a relaying of the received MBS session context information between the first component and the second component.

Aspect 14: The method of any of aspects 1 through 13, wherein the first network node comprises a first base station and the second network node comprises a second base station, the receiving of the multicast-broadcast services session context information for the multicast-broadcast session associated with the second network node being via an Xn interface between the first base station and the second base station; or the first network node comprises a first component of a base station and the second network node comprises a second component of the base station, the receiving of the multicast-broadcast services session context information for the multicast-broadcast session associated with the second network node being via an F1 interface between the first component and the second component.

Aspect 15: An apparatus for wireless communication at a first network node, comprising a processor; memory coupled with the processor; and instructions stored in the memory and executable by the processor to cause the apparatus to perform a method of any of aspects 1 through 14.

Aspect 16: An apparatus for wireless communication at a first network node, comprising at least one means for performing a method of any of aspects 1 through 14.

Aspect 17: A non-transitory computer-readable medium storing code for wireless communication at a first network node, the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first network node, comprising:

receiving, from a second network node, multicast-broadcast services session context information for a multicast-broadcast session associated with the second network node;

transmitting a control message to a user equipment (UE) in accordance with the multicast-broadcast session associated with the second network node and based at least in part on a coordination between the first network node and the second network node, wherein the coordination between the first network node and the second network node comprises a comparing, by the first network node, of the multicast-broadcast session associated with the second network node with a multicast-broadcast session associated with the first network node, and further comprises a relaying of the multicast-broadcast services session context information between the first network node and the second network node; and modifying a connection between the UE and the first network node based at least in part on the control message and the multicast-broadcast services session context information.

2. The method of claim 1, wherein:
the control message to the UE comprises signaling associated with a handover of the UE from the first network node to the second network node based at least in part on matching the multicast-broadcast services session context information for the multicast-broadcast session associated with the second network node to a multicast-broadcast service request of the UE; and
modifying the connection between the UE and the first network node comprises performing the handover of the UE from the first network node to the second network node.

3. The method of claim 2, further comprising:
selecting the second network node as a target base station for the handover of the UE based at least in part on the matching of the multicast-broadcast services session context information for the multicast-broadcast session associated with the second network node to the multicast-broadcast service request of the UE.

4. The method of claim 1, wherein:
the control message to the UE comprises a system information block including information relating to the multicast-broadcast services session context information; and
modifying the connection between the UE and the first network node comprises modifying system information associated with the first network node to include the information relating to the multicast-broadcast services session context information.

5. The method of claim 1, further comprising:
receiving, from the second network node, beam configuration information including, for each beam associated with the beam configuration information, an indication of whether that beam is used for a multicast-broadcast single-frequency network of the multicast-broadcast session associated with the second network node.

6. The method of claim 1, wherein the multicast-broadcast services session context information includes:
a multicast-broadcast services availability for the multicast-broadcast session associated with the second network node;
a multicast-broadcast radio bearer resource configuration for the multicast-broadcast session associated with the second network node; and
a multicast-broadcast single-frequency network configuration for a multicast-broadcast single-frequency network of the multicast-broadcast session associated with the second network node.

7. The method of claim 6, wherein the multicast-broadcast services availability includes a session identifier associated with the multicast-broadcast session associated with the second network node.

8. The method of claim 6, wherein the multicast-broadcast radio bearer resource configuration includes an indication of a directional beam, a frequency domain resource configuration, and a time domain resource configuration associated with the multicast-broadcast session associated with the second network node.

9. The method of claim 6, wherein the multicast-broadcast single-frequency network configuration includes an indication of a directional beam, a geographic area, a frequency domain resource configuration, and a time domain resource configuration associated with the multicast-broadcast single-frequency network of the multicast-broadcast session associated with the second network node.

10. The method of claim 6, wherein the multicast-broadcast single-frequency network configuration includes a back-off request and at least one of a cell list or a beam list for back-off by the first network node.

11. The method of claim 1, wherein:
the control message to the UE comprises signaling configuring a measurement, by the UE, of the multicast-broadcast session associated with the second network node; and
modifying the connection between the UE and the first network node comprises performing a handover of the UE from the first network node to the second network node based at least in part on the measurement by the UE.

12. The method of claim 1, wherein:
the control message to the UE comprises signaling scheduling communication between the UE and the first network node to avoid interference with the multicast-broadcast session associated with the second network node; and
modifying the connection between the UE and the first network node comprises modifying the scheduling of the communication between the UE and the first network node to avoid the interference with the multicast-broadcast session associated with the second network node.

13. The method of claim 1, wherein:
the first network node comprises a first base station and the second network node comprises a second base station, the receiving of the multicast-broadcast services session context information for the multicast-broadcast session associated with the second network node being via an Xn interface between the first base station and the second base station; or
the first network node comprises a first component of a base station and the second network node comprises a second component of the base station, the receiving of the multicast-broadcast services session context information for the multicast-broadcast session associated with the second network node being via an F1 interface between the first component and the second component.

14. An apparatus for wireless communication at a first network node, comprising:
a processor;
memory coupled with the processor; and
instructions stored in the memory and executable by the processor to cause the apparatus to:
receive, from a second network node, multicast-broadcast services session context information for a multicast-broadcast session associated with the second network node;
transmit a control message to a user equipment (UE) in accordance with the multicast-broadcast session associated with the second network node and based at least in part on a coordination between the first network node and the second network node, wherein the coordination between the first network node and the second network node comprises a comparing, by the first network node, of the multicast-broadcast session associated with the second network node with a multicast-broadcast session associated with the first network node, and further comprises a relaying of the multicast-broadcast services session context information between the first network node and the second network node; and modify a connection between the UE and the first network node based at least in part on the control message and the multicast-broadcast services session context information.

15. The apparatus of claim 14, wherein:
the control message to the UE comprises signaling associated with a handover of the UE from the first network node to the second network node based at least in part on matching the multicast-broadcast services session context information for the multicast-broadcast session associated with the second network node to a multicast-broadcast service request of the UE; and
the instructions to modify the connection between the UE and the first network node are further executable by the processor cause the apparatus to perform the handover of the UE from the first network node to the second network node.

16. The apparatus of claim 15, wherein the instructions are further executable by the processor to cause the apparatus to:
select the second network node as a target base station for the handover of the UE based at least in part on the matching of the multicast-broadcast services session context information for the multicast-broadcast session associated with the second network node to the multicast-broadcast service request of the UE.

17. The apparatus of claim 14, wherein:
the control message to the UE comprises a system information block including information relating to the multicast-broadcast services session context information; and
the instructions to modify the connection between the UE and the first network node are further executable by the processor cause the apparatus to modify system information associated with the first network node to include the information relating to the multicast-broadcast services session context information.

18. The apparatus of claim 14, wherein the instructions are further executable by the processor to cause the apparatus to:
receive, from the second network node, beam configuration information including, for each beam associated with the beam configuration information, an indication of whether that beam is used for a multicast-broadcast single-frequency network of the multicast-broadcast session associated with the second network node.

19. The apparatus of claim 14, wherein the multicast-broadcast services session context information includes:
a multicast-broadcast services availability for the multicast-broadcast session associated with the second network node;
a multicast-broadcast radio bearer resource configuration for the multicast-broadcast session associated with the second network node; and
a multicast-broadcast single-frequency network configuration for a multicast-broadcast single-frequency network of the multicast-broadcast session associated with the second network node.

20. The apparatus of claim 19, wherein the multicast-broadcast services availability includes a session identifier associated with the multicast-broadcast session associated with the second network node.

21. The apparatus of claim 19, wherein the multicast-broadcast radio bearer resource configuration includes an indication of a directional beam, a frequency domain resource configuration, and a time domain resource configuration associated with the multicast-broadcast session associated with the second network node.

22. The apparatus of claim 19, wherein the multicast-broadcast single-frequency network configuration includes an indication of a directional beam, a geographic area, a frequency domain resource configuration, and a time domain resource configuration associated with the multicast-broadcast single-frequency network of the multicast-broadcast session associated with the second network node.

23. The apparatus of claim 19, wherein the multicast-broadcast single-frequency network configuration includes a back-off request and at least one of a cell list or a beam list for back-off by the first network node.

24. The apparatus of claim 14, wherein:
the control message to the UE comprises signaling configuring a measurement, by the UE, of the multicast-broadcast session associated with the second network node; and
the instructions to modify the connection between the UE and the first network node are further executable by the processor cause the apparatus to perform a handover of the UE from the first network node to the second network node based at least in part on the measurement by the UE.

25. The apparatus of claim 14, wherein:
the control message to the UE comprises signaling scheduling communication between the UE and the first network node to avoid interference with the multicast-broadcast session associated with the second network node; and
the instructions to modify the connection between the UE and the first network node are further executable by the processor cause the apparatus to modify the scheduling of the communication between the UE and the first network node to avoid the interference with the multicast-broadcast session associated with the second network node.

26. An apparatus for wireless communication at a first network node, comprising:
means for receiving, from a second network node, multicast-broadcast services session context information for a multicast-broadcast session associated with the second network node;
means for transmitting a control message to a user equipment (UE) in accordance with the multicast-broadcast session associated with the second network node and based at least in part on a coordination between the first network node and the second network node, wherein the coordination between the first network node and the second network node comprises a comparing, by the first network node, of the multicast-broadcast session associated with the second network node with a multicast-broadcast session associated with the first network node, and further comprises a relaying of the multicast-broadcast services session context information between the first network node and the second network node; and
means for modifying a connection between the UE and the first network node based at least in part on the control message and the multicast-broadcast services session context information.

27. The apparatus of claim 26, wherein:
the control message to the UE comprises signaling associated with a handover of the UE from the first network node to the second network node based at least in part on matching the multicast-broadcast services session context information for the multicast-broadcast session associated with the second network node to a multicast-broadcast service request of the UE; and the means for modifying the connection between the UE and the first network node comprise means for performing the handover of the UE from the first network node to the second network node.

28. A non-transitory computer-readable medium storing code for wireless communication at a first network node, the code comprising instructions executable by a processor to:

receive, from a second network node, multicast-broadcast services session context information for a multicast-broadcast session associated with the second network node;

transmit a control message to a user equipment (UE) in accordance with the multicast-broadcast session associated with the second network node and based at least in part on a coordination between the first network node and the second network node, wherein the coordination between the first network node and the second network node comprises a comparing, by the first network node, of the multicast-broadcast session associated with the second network node with a multicast-broadcast session associated with the first network node, and further comprises a relaying of the multicast-broadcast services session context information between the first network node and the second network node; and modify a connection between the UE and the first network node based at least in part on the control message and the multicast-broadcast services session context information.

* * * * *